US012595817B2

(12) United States Patent
Yaguchi et al.

(10) Patent No.: US 12,595,817 B2
(45) Date of Patent: Apr. 7, 2026

(54) FASTENER

(71) Applicant: NIFCO INC., Yokosuka (JP)

(72) Inventors: Akihiro Yaguchi, Yokosuka (JP);
Takehiro Sato, Yokosuka (JP)

(73) Assignee: NIFCO INC., Yokosuka (JP)

( * ) Notice: Subject to any disclaimer, the term of this patent is extended or adjusted under 35 U.S.C. 154(b) by 0 days.

(21) Appl. No.: 18/696,201

(22) PCT Filed: Oct. 28, 2022

(86) PCT No.: PCT/JP2022/040358
§ 371 (c)(1),
(2) Date: Mar. 27, 2024

(87) PCT Pub. No.: WO2023/085122
PCT Pub. Date: May 19, 2023

(65) Prior Publication Data
US 2024/0401628 A1      Dec. 5, 2024

(30) Foreign Application Priority Data

Nov. 12, 2021    (JP) ................................. 2021-184572

(51) Int. Cl.
*F16B 21/08*          (2006.01)
*F16B 5/06*           (2006.01)

(52) U.S. Cl.
CPC .......... *F16B 21/084* (2013.01); *F16B 5/0657* (2013.01)

(58) Field of Classification Search
CPC .... F16B 21/084; F16B 5/0657; F16B 21/086;
F16B 5/065; Y10T 24/44026
See application file for complete search history.

(56) References Cited

U.S. PATENT DOCUMENTS

2010/0293761 A1    11/2010  Koike et al.
2017/0182949 A1*    6/2017  Kato ........................ B60R 7/02

FOREIGN PATENT DOCUMENTS

JP          S60-196013 U      12/1985
JP          2000-55021 A       2/2000
(Continued)

OTHER PUBLICATIONS

PCT/ISA/210, "International Search Report for PCT International Application No. PCT/JP2022/040358," Nov. 29, 2022.
(Continued)

*Primary Examiner* — Jack W Lavinder
(74) *Attorney, Agent, or Firm* — HAUPTMAN HAM, LLP

(57)          ABSTRACT

A fastener includes a fitted portion having an elastic piece that is disposed on a side of a base portion configured to allow insertion of the fitted portion into a through hole by elastic deformation in a direction of approaching a base portion and to engage the through hole at an insertion point of the insertion by elastic return in an end position of the insertion, and that is configured to, if force in a direction of pulling out the fitted portion from the through hole is applied, cause the elastic deformation in the approaching direction. The base portion includes an abutting portion abutting on the elastic piece if the force in the pulling-out direction is applied, and, if the force in the pulling-out direction is equal to or greater than a predetermined magnitude, the elastic piece bends in a direction toward a central axis of the fitted portion.

11 Claims, 13 Drawing Sheets

(56) References Cited

FOREIGN PATENT DOCUMENTS

| JP | 2014-9743 | A | 1/2014 |
| JP | 5558322 | B2 | 7/2014 |
| WO | 2009/093496 | A1 | 7/2009 |

OTHER PUBLICATIONS

Japan Patent Office, Notice of Reasons for Refusal for Japanese Patent Application No. 2021-184572 mailed on Apr. 30, 2024; 6 pp.

* cited by examiner

FASTENER

FIELD OF THE INVENTION

This invention relates to improvement of a fastener that includes a fitted portion fitted into through a hole defined in various objects to be attached and that is attached to the objects to be attached by fitting so as to close the through holes.

BACKGROUND OF THE INVENTION

Patent Literature 1 discloses a clip (fastener) in which an anchor inserted into and engaging with an attachment hole (through hole) is composed of a pair of pillars, in which, if removing force exceeding holding force is applied to the anchor, the pillars tilt in mutually crossing directions, so that the anchor can be removed from the attachment hole without difficulty, so that repeated use is assured.

CITATION LIST

Patent Literature

Patent Literature 1: Japanese Patent No. 5558322

SUMMARY OF THE INVENTION

Technical Problem

In the clip in Patent Literature 1, the tilting direction of the pillar to cancel the engagement of the anchor with the attachment hole is constant, and, unless the pillar deforms toward the direction by a predetermined amount, the engagement is not canceled. Thus, the clip in Patent Literature 1 leaves room for consideration for a structure capable of further reducing a load on the anchor in removal of the clip from the attachment hole.

A main problem to be solved by this invention is to rationally provide a fastener of this type with a structure capable of more effectively reducing a load on a fitted portion of the fastener of this type in removing the fastener from a through hole.

Solution to Problem

To solve the above-described problem, in the invention, a fastener includes a fitted portion fitted into a through hole disposed in an object to be fastened, the fitted portion includes:
  a base portion; and
  an elastic piece that is disposed on a side of the base portion, that is configured to allow insertion of the fitted portion into the through hole by elastic deformation in a direction of approaching the base portion and to engage with the through hole at an insertion point of the insertion by elastic return in an end position of the insertion, and that is configured to, upon application of force in a direction of pulling out the fitted portion from the through hole, cause the elastic deformation in the approaching direction,
the base portion is provided with an abutting portion abutting on the elastic piece upon application of the force in the pulling-out direction, and
when the force in the pulling-out direction is equal to or greater than a predetermined magnitude, the elastic piece bends in a direction toward a central axis of the fitted portion on an inner side relative to the abutting portion.

If the force in the direction of pulling out the fitted portion from the through hole is applied to the fastener, the elastic piece engaging with the through hole elastically deforms in the direction of approaching the base portion. However, this elastic deformation is restrained by abutting the elastic piece on the abutting portion of the base portion. This can prevent the engagement between the through hole and the elastic piece from being canceled as long as the force in the pulling-out direction is less than the predetermined magnitude. On the other hand, if the force in the pulling-out direction is equal to or greater than the predetermined magnitude, the elastic piece bends in the direction toward the central axis of the fitted portion, which is on the inner side relative to the abutting portion.

With this, if the fastener receives application of the force in the direction of pulling out the fitted portion from the through hole to remove the fastener from the object to be fastened, the elastic piece elastically deforms in the direction of approaching the base portion first, and then, the elastic piece deforms in the bending manner in the direction toward the central axis. These two types of deformations in different deforming directions can cancel the engagement between the through hole and the elastic piece. Thus, each of the amount of deformation of the elastic piece in the direction of approaching the base portion and the amount of deformation of the elastic piece in the direction toward the central axis when the fastener is removed from the object to be fastened can be minimized. Hence, occurrence of buckling, rupture, or the like of the elastic piece during the removal can be prevented as much as possible. Furthermore, the fastener can be removed from the object to be fastened in a reusable state.

One aspect of this invention is that the fitted portion includes a guide portion formed to be aligned with one imaginary plane containing the central axis, and an end of the fitted portion on a side having the insertion point is composed of an end of the guide portion.

Another aspect of this invention is that the guide portion includes a second portion crossing a first portion aligned with the one imaginary plane, at the central axis.

Yet another aspect of this invention is that the elastic piece has a bending piece shape including an inner arm portion that extends in a direction along the central axis with an interval to the base portion and an outer arm portion that extends from an end of the inner arm portion on a side with the insertion point toward a side with a foundation portion of the fitted portion.

Yet another aspect of this invention is that the end, on the insertion point side, of the inner arm portion of the elastic piece is configured to, upon application of the force in the pulling-out direction, abut on the abutting portion of the base portion.

Yet another aspect of this invention is that a support protruding portion protruding toward a side with the guide portion is formed on the outer arm portion of the elastic piece.

Yet another aspect of this invention is that both or either one of the abutting portion and a portion, abutting on the abutting portion, of the elastic piece is a protruding portion.

Yet another aspect of this invention is that the elastic piece is disposed on each side of the base portion.

Yet another aspect of this invention is that the base portion is disposed on each side of the guide portion, the elastic piece is disposed on each side of the base portion located on a first side of the guide portion, and the elastic piece is disposed on each side of the base portion located on a second side of the guide portion.

Yet another aspect of this invention is that distances between ends, engaging with the through hole and located on the foundation portion side of the fitted portion, of the outer arm portions of the elastic pieces and the central axis are equal to each other among the four elastic pieces.

Advantageous Effects of the Invention

According to this invention, the fastener of this type can rationally be provided with a structure capable of effectively reducing a load on the fitted portion of the fastener of this type in removal of the fastener from the through hole.

DESCRIPTION OF THE EMBODIMENTS

A typical embodiment of this invention will be described below with reference to FIGS. 1 to 16. A fastener 1 according to this embodiment includes a fitted portion 2 fitted into a through hole Pa defined in various objects P to be attached (see FIGS. 9, 11, and 13) and is attached to the object P to be attached by the fitting so as to close the through hole Pa. That is, the fastener 1 is a substitute for an axial fixing body, such as a rivet.

The fastener 1 can be used, for example, to, in a state where two objects P to be attached including through holes Pa are overlapped so that the through holes Pa communicate each other, be fitted into the through holes Pa to fasten the two objects P to be attached together.

The fastener 1 can also be used as a hole plug that, when a through hole Pa disposed in an object P to be attached is not in use, is removably fitted into the through hole Pa. To be more specific, the fastener 1 can also be used as a hole plug for a through hole Pa or the like for attaching an optional accessory of an automobile, an electric appliance, and the like.

The fastener 1 can also be used to combine an object P to be attached via the fitted portion 2 with another object P' (see FIG. 9) by using a portion that is not inserted into a through hole Pa.

Figure 9:
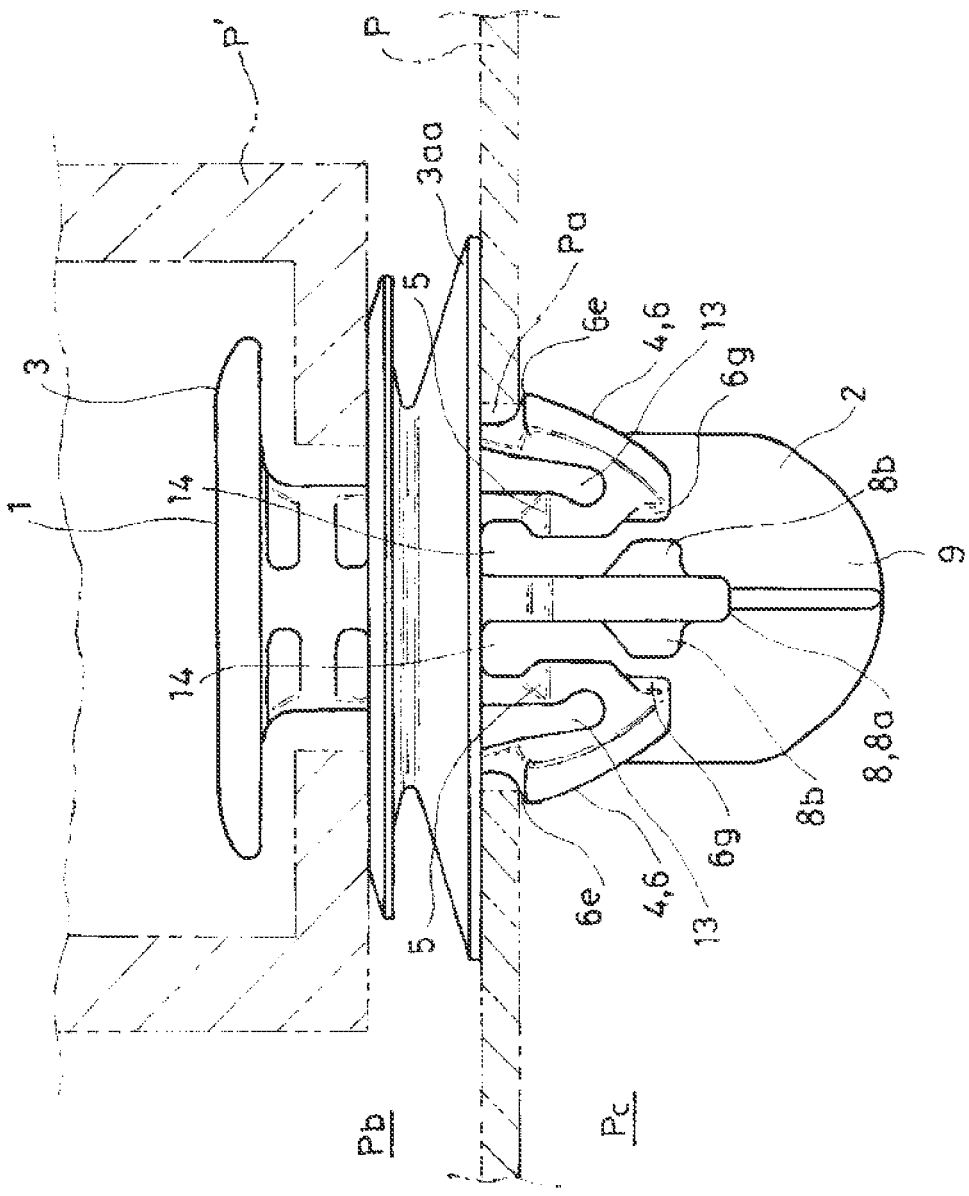
FIG. 9 is a side view illustrating a usage state of the fastener.
Figure 10:
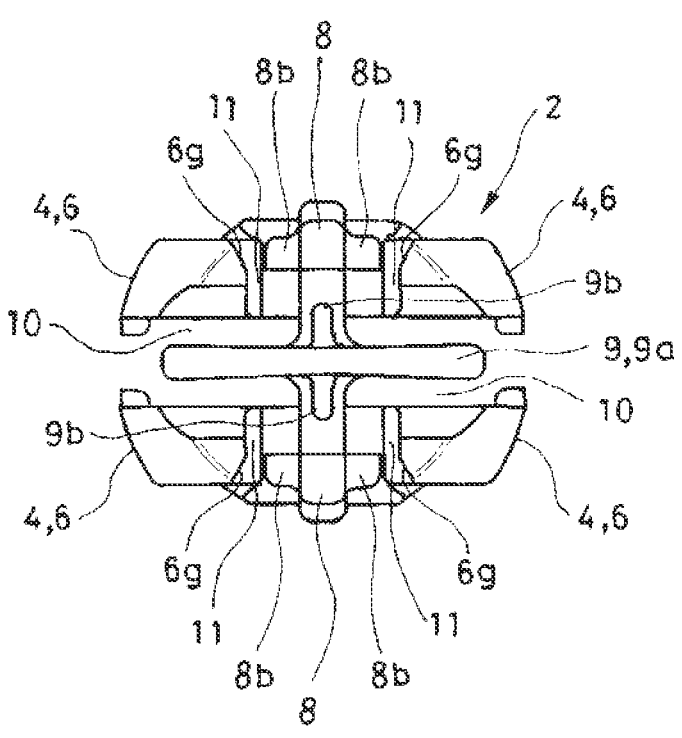
FIG. 10 is a bottom view of a fitted portion in the state in FIG. 9.

In the illustrated example, the fastener 1 includes a head portion 3 as a portion that is not inserted and the fitted portion 2, and can use this head portion 3 to combine an object P to be attached including a through hole Pa into which the fitted portion 2 is fitted with the other object P' (see FIG. 9).

The head portion 3 is composed of a plurality of disk-shaped bodies 3a that is centered on a central axis x (see FIGS. 4, 5, 6, and 8, an imaginary straight line passing through the center of the fastener 1 in an inserting direction y (see FIG. 1) of the fitted portion 2 into the through hole Pa) of the fastener 1 and that is stacked in three layers with intervals between the adjacent disk-shaped bodies 3a in a direction along the central axis x.

The disk-shaped body 3aa located adjacent to a foundation portion 2a of the fitted portion 2 has the largest diameter, and the other disk-shaped body 3a is smaller in diameter as they are away from this foundation portion 2a. Between the disk-shaped body 3ac having the smallest diameter and the intermediate disk-shaped body 3ab, a neck portion 3b along the central axis x is formed.

The disk-shaped body 3aa located adjacent to the foundation portion 2a of the fitted portion 2 and having the largest diameter is provided with such inclination that the distance to the intermediate disk-shaped body 3ab gradually increases toward the edge. When the fitted portion 2 is fully fitted into the through hole Pa as described below, the disk-shaped body 3aa having the largest diameter elastically deforms in such a direction that this inclination becomes less, thereby coming into close contact with the hole edge of the through hole Pa on an insertion entrance side Pb.

The fitted portion 2 protrudes from the center of the disk-shaped body 3aa having the largest diameter along the central axis x on the side opposite to the side having the disk-shaped bodies 3a.

Figure 1:
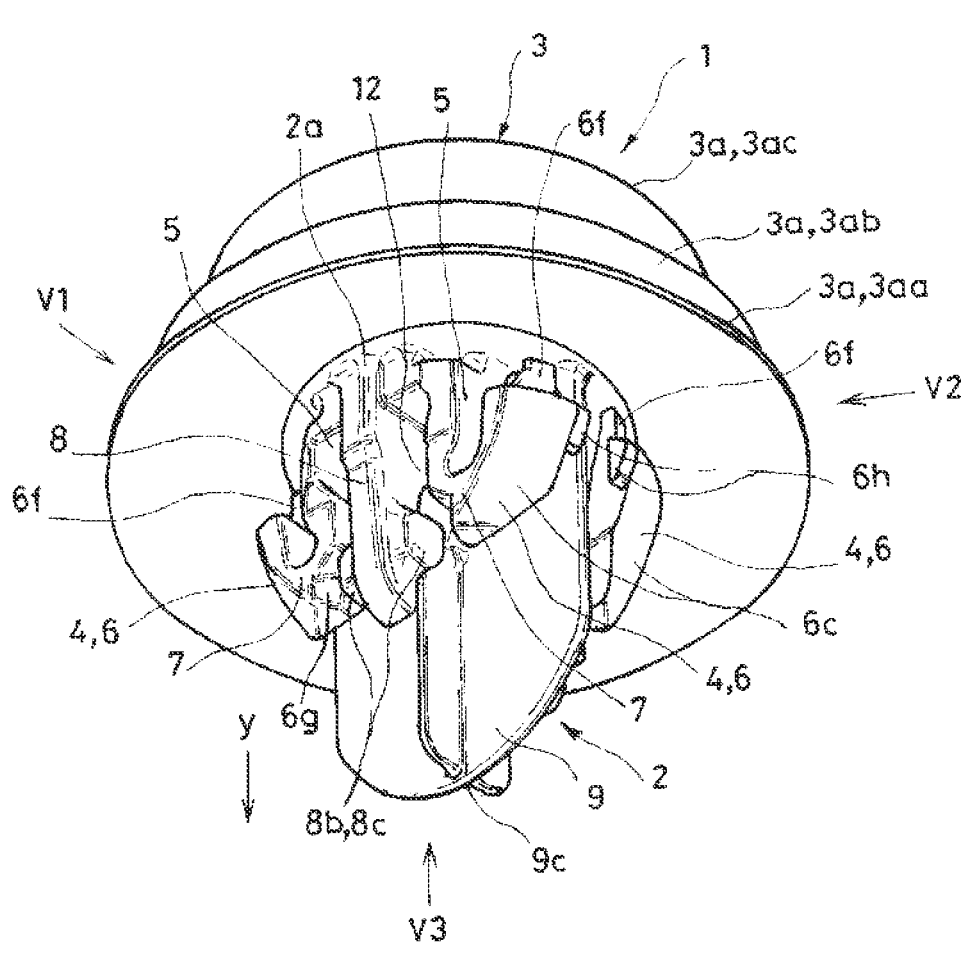
FIG. 1 is a perspective view of a fastener according to one embodiment of this invention.
Figure 2:
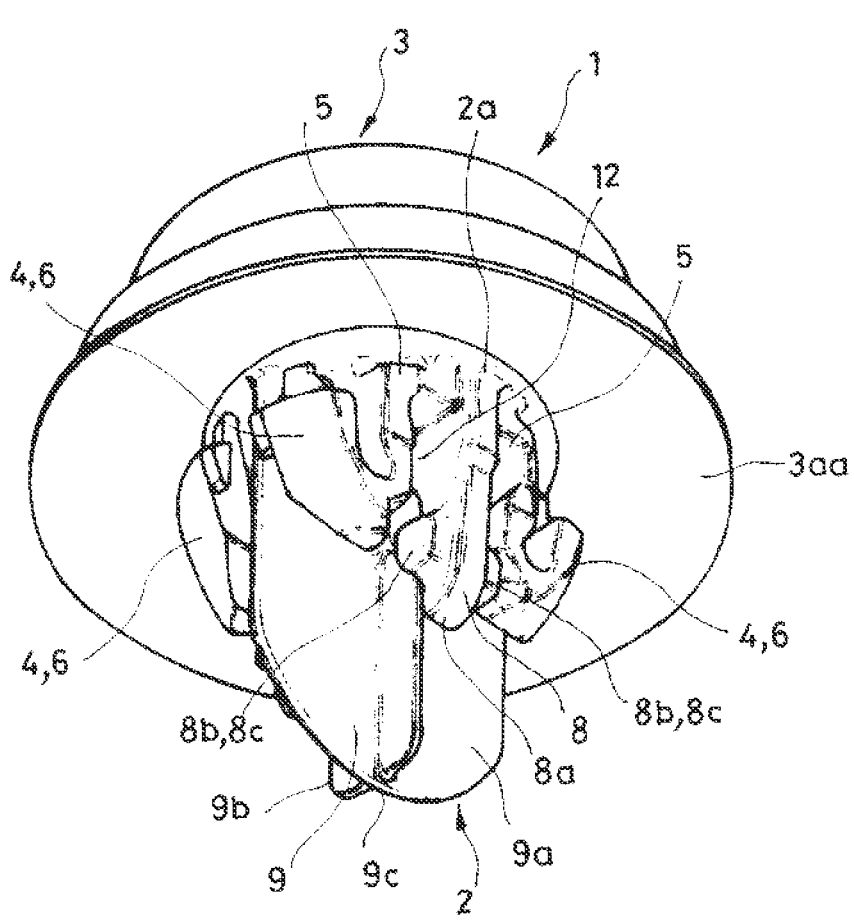
FIG. 2 is a perspective view of the fastener when viewed from a direction opposite to that in FIG. 1.
Figure 3:
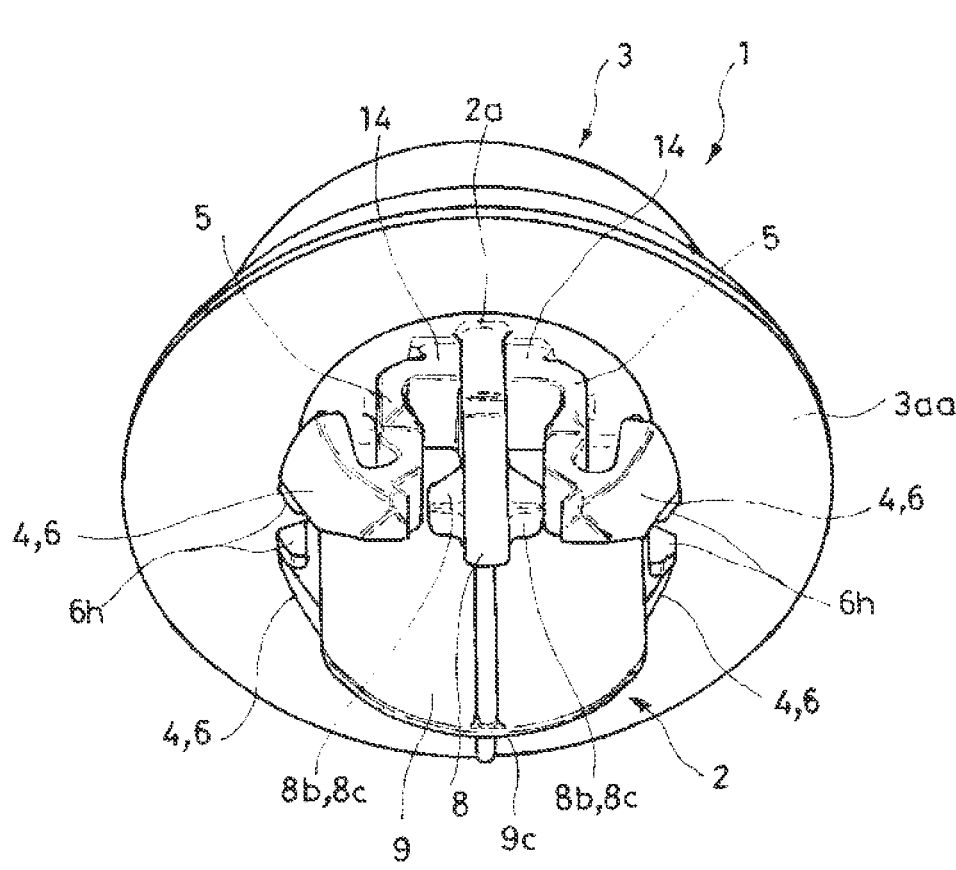
FIG. 3 is a perspective view of the fastener when viewed from a direction differing from those in FIGS. 1 and 2.

On the fitted portion 2, an elastic piece 4 is disposed in each of four regions divided by one imaginary plane (FIG. 6, hereinafter referred to as a first plane S1) containing the central axis x and an imaginary plane (FIG. 6, hereinafter referred to as a second plane S2) orthogonal to this first plane S1 at the central axis x. Furthermore, a base portion 8 is disposed on each side of the first plane S1 and between the elastic pieces 4 in two positions. Furthermore, as illustrated in FIG. 2, a guide portion 9 is provided to include a plate-shaped first portion 9a formed so that a plate surface is aligned with the first plane S1 and a fin-shaped second portion 9b formed so that a plate surface is aligned with the second plane S2 formed to cross this first portion 9a at the central axis x.

That is, in this embodiment, the elastic piece 4 is provided on each side of one base portion 8.

Furthermore, the base portion 8 is provided on each side of the guide portion 9, the elastic piece 4 is provided on each side of the base portion 8 located on one side of the guide portion 9, and the elastic piece 4 is provided on each side of the base portion 8 located on the other side of the guide portion 9.

Furthermore, the distances between ends (ridge portions 6e, which will be described later), engaging with the through hole Pa and located adjacent to the foundation portion 2a of the fitted portion 2, of outer arm portions 6, which will be described later, of the elastic pieces 4 and the central axis x are equal to each other among the four elastic pieces 4.

To be more specific, on each side of the first plane S1, the elastic piece 4 located on one side of the second plane S2 has a form that is substantially symmetrical to the elastic piece 4 located on the other side.

Figure 6:
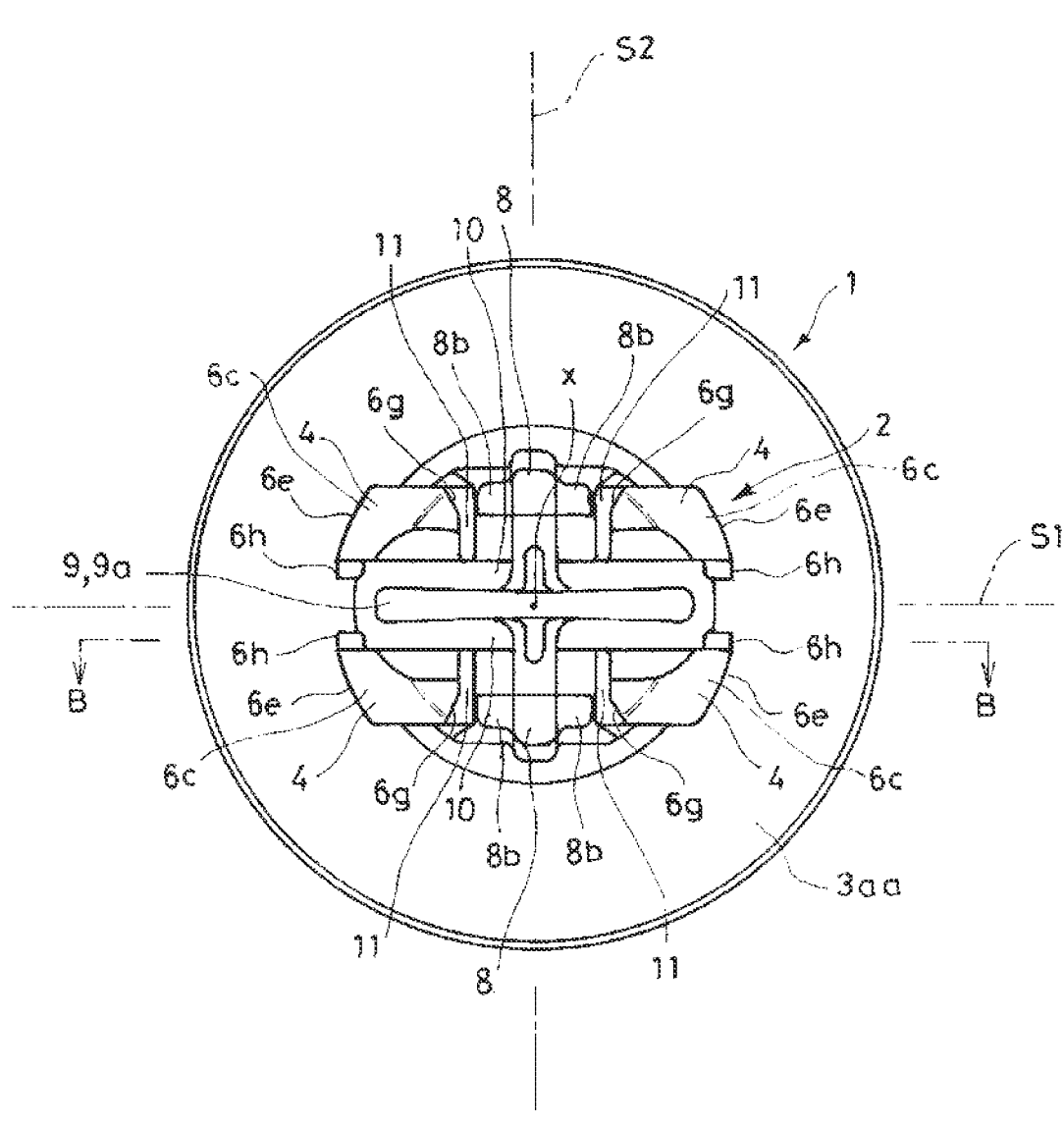
FIG. 6 is a bottom view of the fastener when viewed from the direction V3 in FIG. 1.
Figure 7:
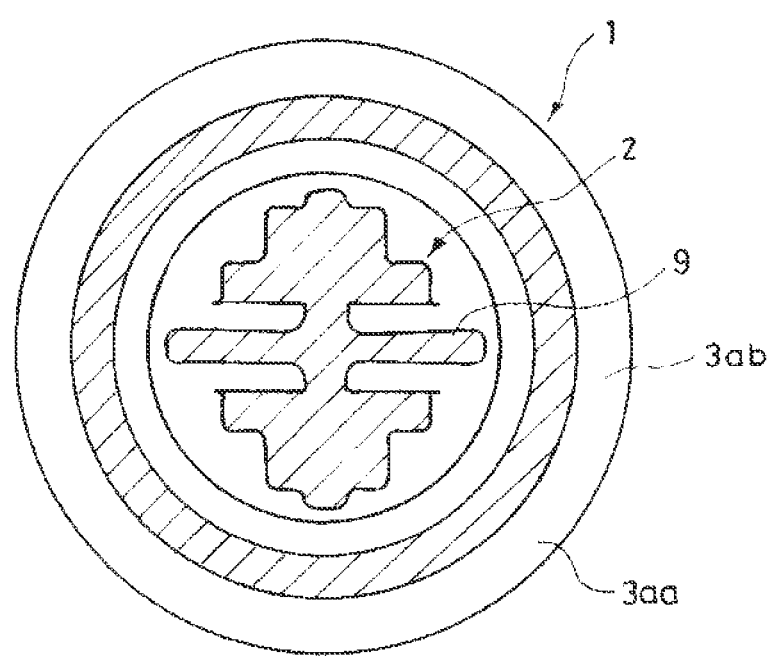
FIG. 7 is a sectional view taken along the line A-A in FIG. 4.

As illustrated in FIG. 6, gaps 10 are defined between the guide portion 9 and the base portions 8 and elastic pieces 4 in a direction orthogonal to the central axis x, and gaps 11 are also defined between the base portions 8 and the elastic pieces 4 in a direction orthogonal to the central axis x.

The guide portion 9 is formed so that an end 9c of the guide portion 9 forms an end functioning as an insertion point Pc of the fitted portion 2 into the through hole Pa.

In the illustrated example, the guide portion 9 is formed to have a cross-shaped section in a direction orthogonal to the central axis x.

The first portion 9a has a width (dimension in a direction along the first plane S1) substantially equal to or slightly smaller than the hole diameter of the through hole Pa. The end 9c and its adjacent portion of the first portion 9a are formed to follow an arc of an imaginary circle to facilitate introduction into the through hole Pa.

The second portion 9b has a width (dimension in a direction along the second plane S2) smaller than that of the first portion 9a, and the base portions 8 are disposed with intervals to a protrusion end 9d of the second portion 9b.

The guide portion 9 has its end 9c which is the end of the fitted portion 2, and is difficult to deform because the guide portion 9 has the cross-shaped section as described above, and insertion of the fitted portion 2 into the through hole Pa is stably guided by the guide portion 9. Ends of the base portions 8 and bending portions 7 (joints between inner arm portions 5, which will be described later, and the outer arm portions 6) of the elastic pieces 4 are positioned in the middle of the entire length (length of the guide portion 9 in the inserting direction y into the through hole Pa) of the guide portion 9, and, at the timing when the guide portion 9 is inserted into the through hole Pa to the middle of the entire length, elastic deformation of the elastic pieces 4 starts.

Each of the base portions 8 has a rod shape protruding in the direction along the central axis x with one end joined integrally to the head portion 3.

Figure 5:
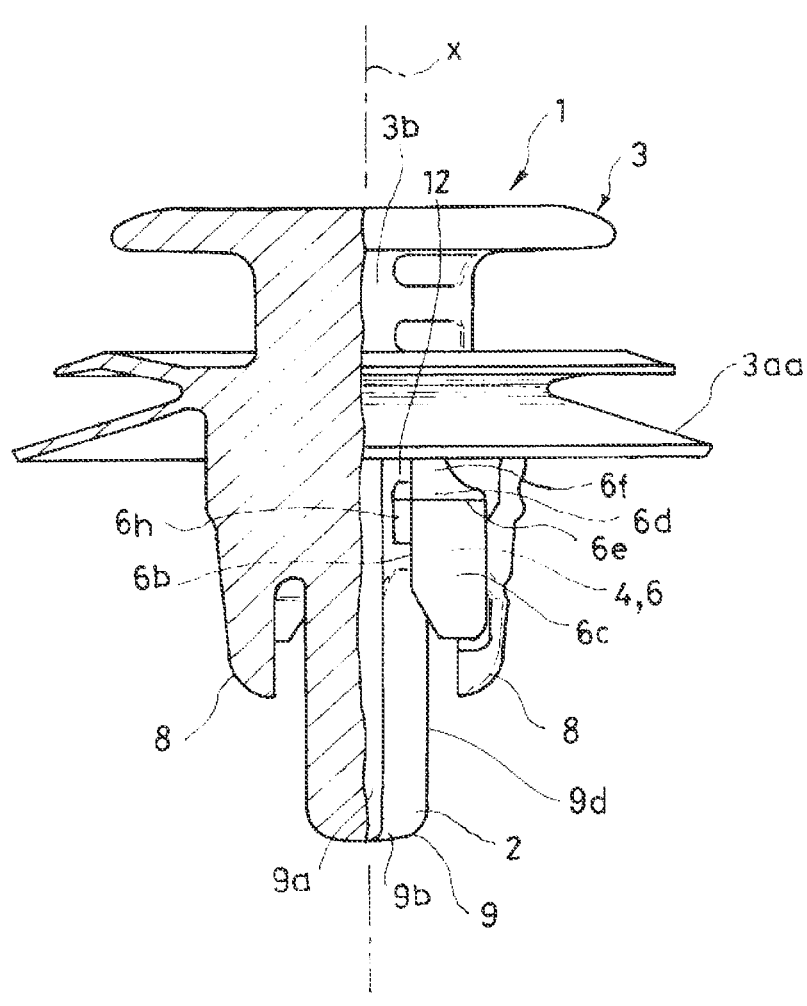
FIG. 5 is a side view of the fastener cut in half when viewed from the direction V2 in FIG. 1, illustrating a section on the left side.

As illustrated in FIGS. 2 and 5, a portion, adjacent to the foundation portion, of the base portion 8 is integrated with the second portion 9b of the guide portion 9 via a joint portion 12, and the base portion 8 is also formed to be difficult to deform.

The base portion 8 is provided with abutting portions 8b that abut on the elastic pieces 4 if force is applied to the fastener 1 in a direction in which the fitted portion 2 fitted into the through hole Pa is pulled out from this through hole Pa. In the example illustrated in FIGS. 1 to 14, the abutting portions 8b are formed as protruding portions 8c.

The protruding portions 8c are disposed in a position slightly closer to the foundation portion relative to the end 8a of the base portion 8, on both sides of the second plane S2.

The protruding portions 8c include straight protrusion ends 8d along the central axis x in a state (see FIGS. 8 and 9) where the fitted portion 2 is viewed from a direction facing the first plane S1 (see FIG. 6), and have such a form that level difference portions 8e facing the portion, adjacent to the foundation portion, of the base portion 8 incline so that the protrusion dimensions of the protruding portions 8c gradually decrease toward this portion adjacent to the foundation portion.

The elastic pieces 4 are disposed on the sides of the base portions 8, are formed to allow insertion of the fitted portion 2 into the through hole Pa by elastic deformation in the directions of approaching the base portions 8 and to engage with the through hole Pa at the insertion point Pc of the insertion by elastic return in an end position of the insertion, and are configured to, if force f1 (see FIG. 11) in the direction of pulling out the fitted portion 2 from the through hole Pa is applied, cause the elastic deformation in the approaching directions.

Figure 8:
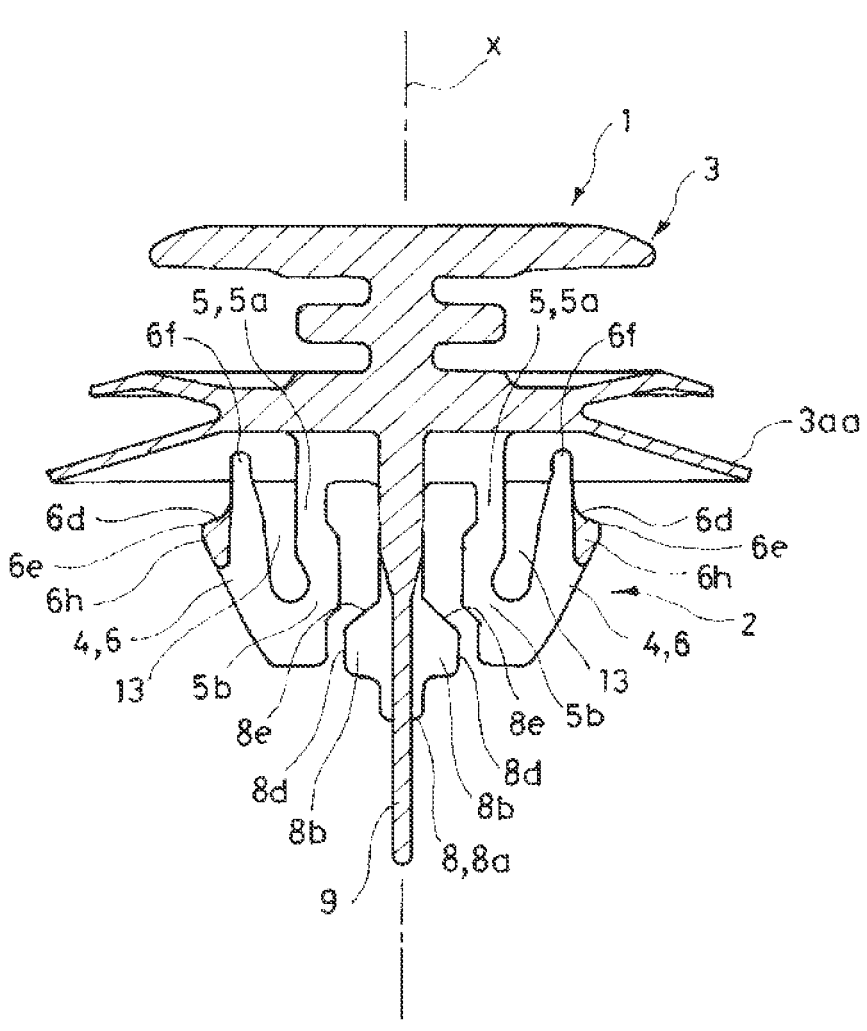
FIG. 8 is a sectional view taken along the line B-B in FIG. 6.

In this embodiment, as illustrated in FIG. 8, the elastic piece 4 has a bending piece shape including the inner arm portion 5 that extends in the direction along the central axis x with an interval to the base portion 8 and the outer arm portion 6 that extends from an end, which is the insertion point Pc of the fitted portion 2 into the through hole Pa, of the inner arm portion 5 toward the foundation portion 2a of the fitted portion 2.

In the state where the fitted portion 2 is viewed from the direction facing the first plane S1, gaps 14 and 13 are defined respectively between the base portions 8 and the inner arm portions 5 and between the inner arm portions 5 and the outer arm portions 6 (see FIG. 9).

Each of the outer arm portions 6 includes a surface 6a (see FIG. 4) facing the inner arm portion 5, a surface 6b (see FIG. 5) facing the guide portion 9, and an outer surface 6c coming into sliding contact with the through hole Pa during the insertion. In a state where the fitted portion 2 is viewed from a direction orthogonal to the central axis x, this outer surface 6c is bent along an arc of an imaginary circle (see FIG. 6), and the fitted portion 2 can be smoothly fitted into the through hole Pa.

Furthermore, the outer surface 6c of the outer arm portion 6 inclines in such a direction that the distance to the base portion 8 gradually increases from the bending portion 7 which is the joint to the inner arm portion 5 toward the head portion 3 side, and the outer surface 6c of the outer arm portion 6 is a three-dimensional curved surface having the above-described bending and this inclination.

Figure 4:
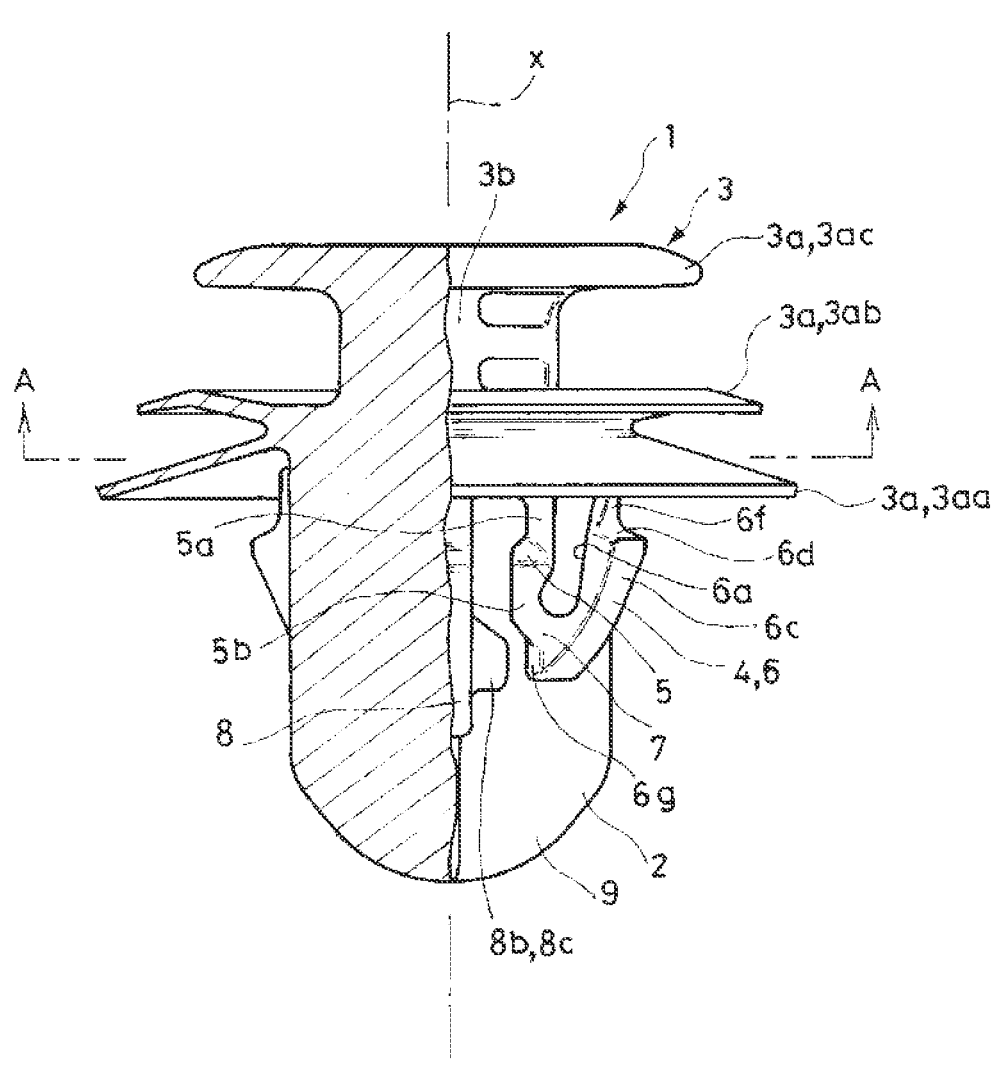
FIG. 4 is a side view of the fastener cut in half when viewed from the direction V1 in FIG. 1, illustrating a section on the left side.

In the illustrated example, as illustrated in FIG. 4, a foundation portion 5a of the inner arm portion 5 is integrated on the foundation portion side of the base portion 8 via the joint portion 12.

Furthermore, in the illustrated example, a portion adjacent to the foundation portion 5a and a portion adjacent to an end 5b of the inner arm portion 5 are each formed to have a sectional area smaller than that of an intermediate portion, and the elastic piece 4 readily causes elastic deformation at each of the portion adjacent to the foundation portion 5a and the portion adjacent to the end 5b of the inner arm portion 5.

The outer arm portion 6 includes an engaging surface 6d that is disposed between an end located close to the head portion 3 and the outer surface 6c having the three-dimensional curved surface shape and that faces the head portion 3. On each side of the guide portion 9, the distance (see FIG. 6) between the ridge portion 6e (engaging end) at which the engaging surface 6d and the outer surface 6c comes into contact with each other in the elastic pieces 4 formed on both sides of the base portion 8 is slightly larger than the hole diameter of the through hole Pa (see FIG. 9).

With this, when the fitted portion 2 is inserted into the through hole Pa, the outer surfaces 6c of the outer arm portions 6 come into sliding contact with the hole edge of the through hole Pa, and the elastic pieces 4 elastically deform in the directions of approaching the base portions 8 to allow the insertion. When the ridge portions 6e reach the further side of the hole edge of the through hole Pa on the insertion point Pc side, elastic return of the elastic pieces 4 is allowed, and the engaging surfaces 6d engage with the hole edge of the through hole Pa on the insertion point Pc side. Then, the fastener 1 is fastened to the object P to be attached in such a manner that the object P to be attached is sandwiched between the disk-shaped body 3aa forming the head portion 3 and having the largest diameter and the elastic pieces 4.

In this engaging state, the outer arm portions 6 are made such that extending portions 6f (see FIG. 8) located between the ends of the outer arm portions 6 and the engaging surfaces 6d are located in the through hole Pa (see FIG. 9). If the force f1 in the direction of pulling out the fitted portion 2 from the through hole Pa is applied to the fastener 1, these extending portions 6f allow the elastic pieces 4 to elastically deform in the directions m1 of approaching the base portions 8 (see FIGS. 11 and 12).

As illustrated in FIG. 4, in a position facing the protruding portion 8c of the base portion 8 in the vicinity of the bending portion 7 of each elastic piece 4, a receiving surface 6g facing the straight protrusion end 8d of the protruding portion 8c is formed. This receiving surface 6g has such an inclination that the distance to the base portion 8 gradually increases as it is located away from the central axis x.

Figure 11:
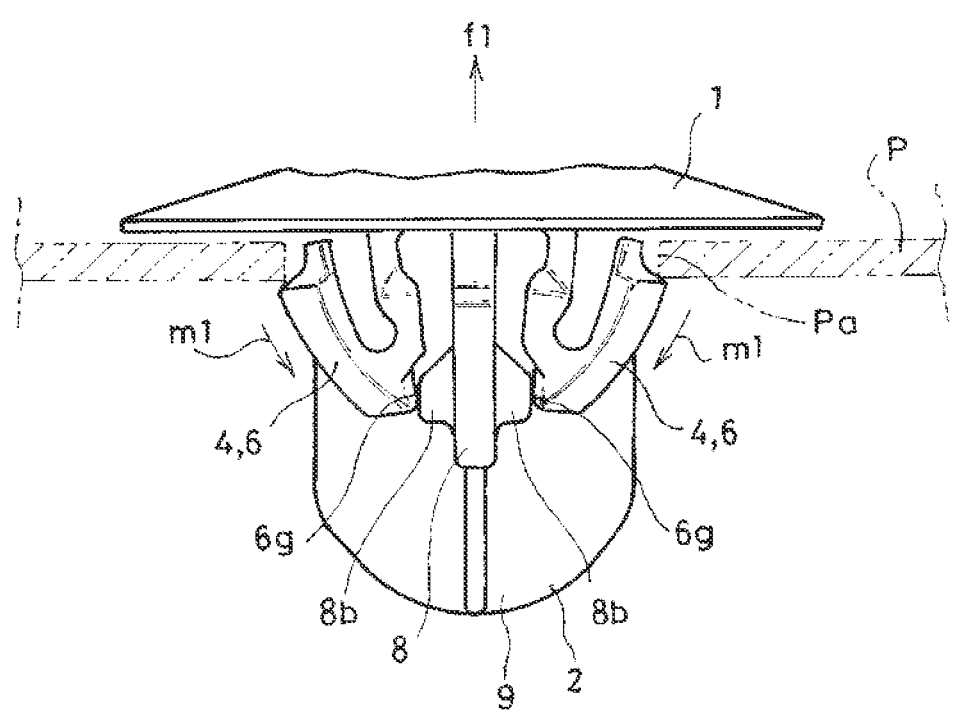
FIG. 11 is a side view of a main portion when removing force is applied in the state in FIG. 9.
Figure 12:
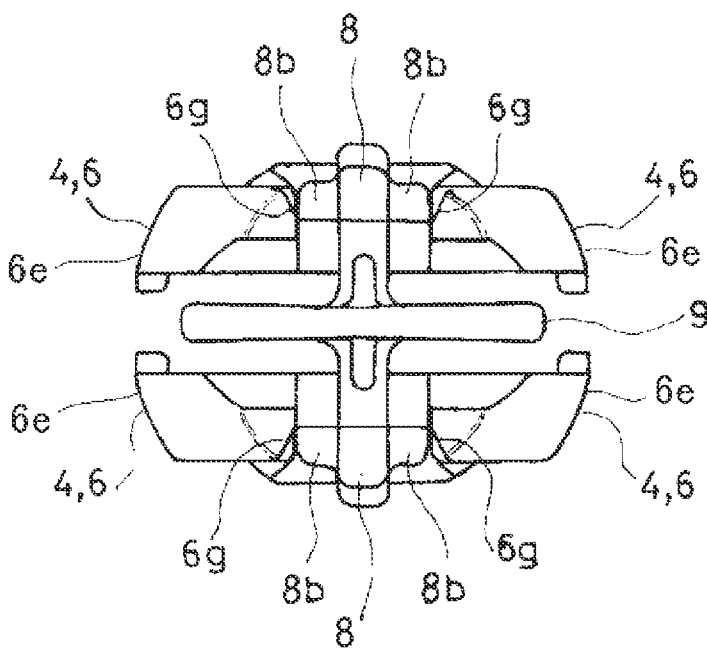
FIG. 12 is a bottom view of the fitted portion in the state in FIG. 11.
Figure 13:
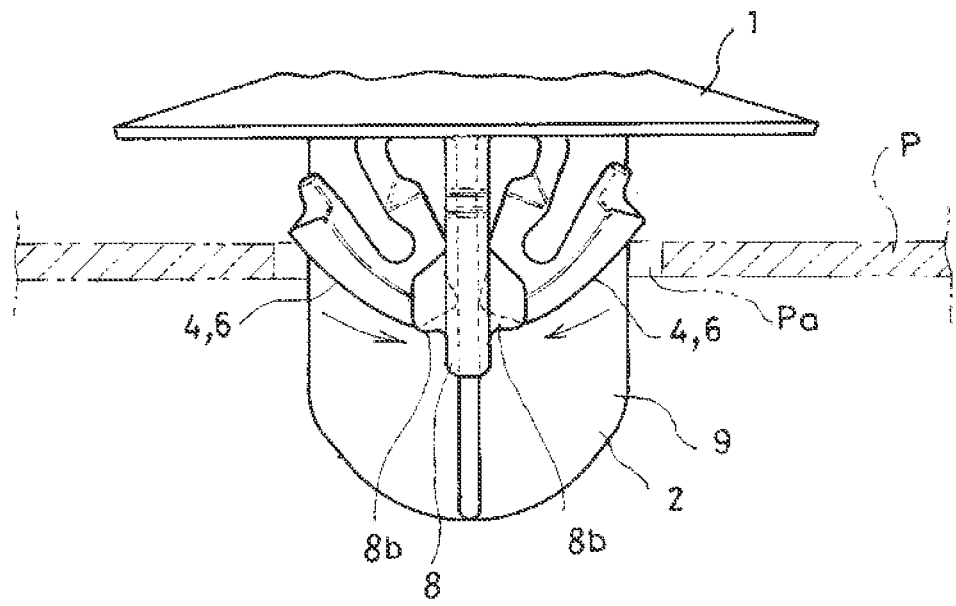
FIG. 13 is a side view of the main portion when removing force greater than that in the state in FIG. 11 is applied.

If the force f1 in the direction of pulling out the fitted portion 2 from the through hole Pa is applied to the fastener 1, the elastic pieces 4 engaging with the through hole Pa elastically deform in the directions m1 of approaching the base portions 8, but this elastic deformation is restrained by abutting of the elastic pieces 4 on the abutting portions 8b of the base portions 8 (see FIGS. 11 and 12). This can prevent the engagement between the through hole Pa and the elastic pieces 4 from being canceled as long as the force f1 in the pulling-out direction is less than a predetermined magnitude.

In the example illustrated in FIGS. 1 to 14, the abutting portions 8b are the protruding portions 8c. On the other hand, in the example illustrated in FIG. 15, the abutting portions 8b are formed to have a flat shape, and portions, abutting on these abutting portions 8b, of the elastic pieces 4 are protruding portions 4a. Furthermore, in the example illustrated in FIG. 16, the abutting portions 8b are the protruding portions 8c, and portions, abutting on these abutting portions 8b, of the elastic pieces 4 are protruding portions 4a. In either case, by adjusting the protrusion dimensions of the protruding portions 8c and 4a, the removing force on the fastener 1 can properly be controlled.

Figure 15:
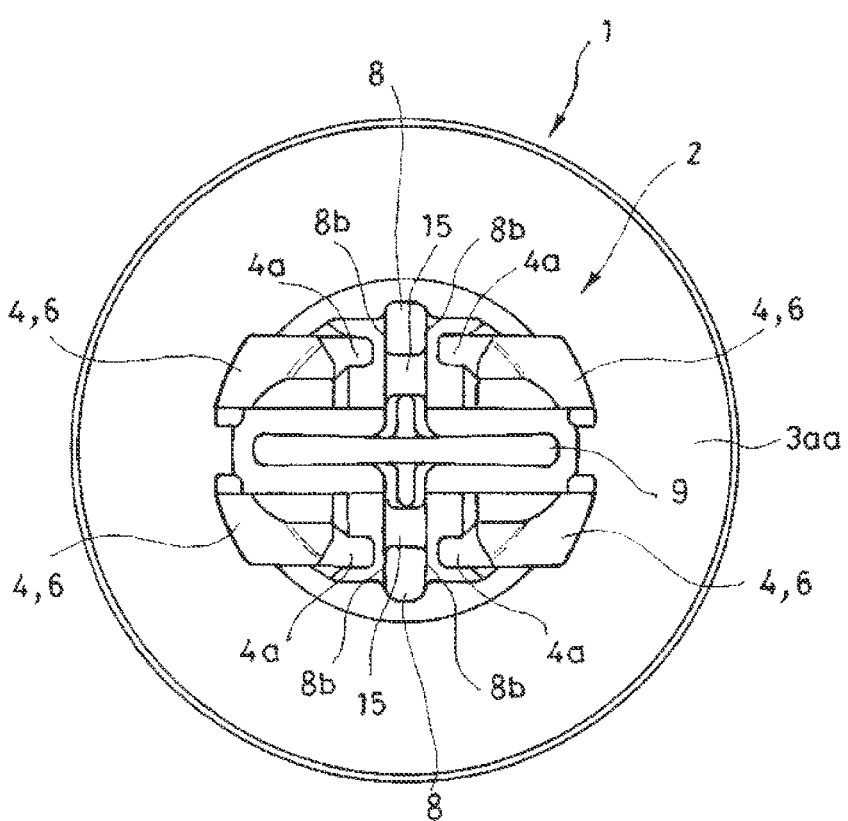
FIG. 15 is a bottom view illustrating a partially modified example of the fitted portion.
Figure 16:
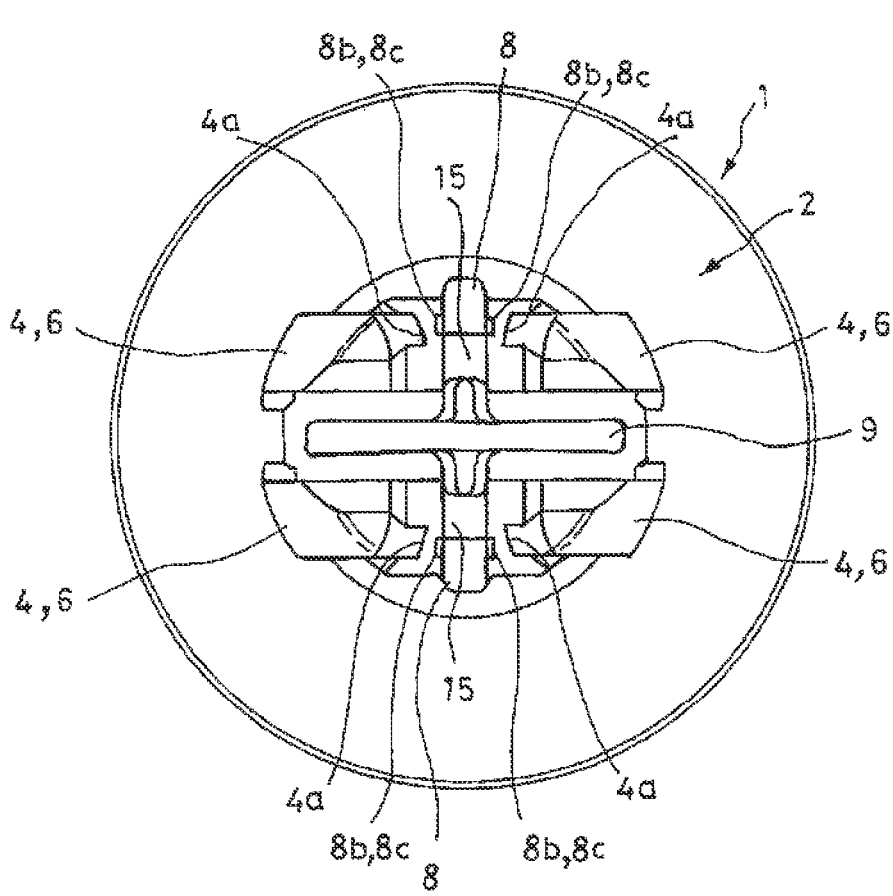
FIG. 16 is a bottom view illustrating a partially modified example of the fitted portion.

Note that, if the elastic pieces 4 are provided with the protruding portions 4a as in FIGS. 15 and 16, escape portions 15 for the protruding portions 4a of the elastic pieces 4 are formed at portions, closer to the central axis x relative to the base portions 8, of the abutting portions 8b, and if the force f1 in the pulling-out direction is equal to or greater than the predetermined magnitude as described below, the protruding portions 4a of the elastic pieces 4 enter the escape portions 15, which are on inner sides relative to the abutting portions 8b.

On the other hand, in the example illustrated in FIGS. 1 to 14, if the force f1 in the pulling-out direction is equal to or greater than the predetermined magnitude, the elastic pieces 4 bend in the directions m2 (see FIG. 14) toward the central axis x of the fitted portion 2, which is on inner sides relative to the abutting portions 8b. In the example illustrated in FIGS. 1 to 14, if the force f1 in the pulling-out direction is equal to or greater than the predetermined magnitude, the inclination of the receiving surfaces 6g allows the receiving surfaces 6g to enter portions, closer to the central axis x relative to the abutting portions 8b, of the abutting portions 8b, that is, cancels the abutting state of the abutting portions 8b on the elastic pieces 4, and the elastic pieces 4 elastically deform to such positions that the ridge portions 6e enter the through hole Pa to cancel the engagement between the elastic pieces 4 and the through hole Pa (see FIGS. 13 and 14).

That is, if the example fastener 1 illustrated in FIGS. 1 to 14 receives application of the force f1 in the direction of pulling out the fitted portion 2 from the through hole Pa to remove the fastener 1 from an object to be fastened, the elastic pieces 4 elastically deform in the directions m1 of approaching the base portions 8 first, and then, the elastic pieces 4 deform in the bending manner in the directions m2 toward the central axis x. These two types of deformation in different deforming directions cancel the engagement between the through hole Pa and the elastic pieces 4. Thus, each of the amount of deformation of the elastic pieces 4 in the directions m1 of approaching the base portions 8 and the amount of deformation of the elastic pieces 4 in the directions m2 toward the central axis x when the fastener 1 is removed from the object to be fastened can be minimized, and occurrence of buckling, rupture, or the like of the elastic pieces 4 in the removal is prevented as much as possible, which enables the fastener 1 to be removed from the object to be fastened in a reusable state.

Figure 14:
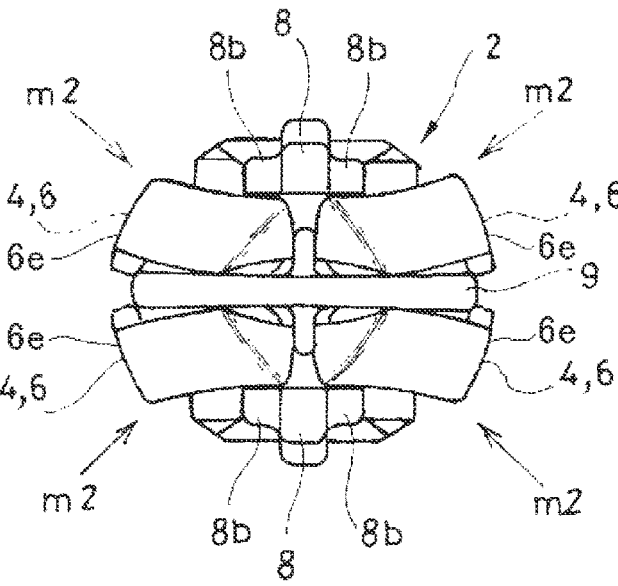
FIG. 14 is a bottom view of the fitted portion in the state in FIG. 13.

In the illustrated example, the ridge portion 6e of each of the four elastic pieces 4 approaches the central axis x, as illustrated in FIG. 14, from the position illustrated in FIG. 12, which cancels the engagement between the elastic pieces 4 and the through hole Pa.

Furthermore, in this embodiment, on the outer arm portions 6 of the elastic pieces 4, support protruding portions 6h protruding toward the guide portion 9 are formed.

In the illustrated example, the support protruding portions 6h protrude toward the guide portion 9 from edges where the surfaces 6b facing the guide portion 9 and the outer surfaces 6c are adjacent to each other between the engaging surfaces 6d and the bending portions 7 in the outer arm portions 6.

This can control orientations of the elastic pieces 4 bending in the directions toward the central axis x and enables stable removal of the fitted portion 2 from the through hole Pa. In the illustrated example, when bending in the directions toward the central axis x, the elastic pieces 4 cause the support protruding portions 6h to come into contact with the guide portion 9, thereby bending in the directions toward the central axis x without pressing the base portions 8 outward by the elastic pieces 4 (see FIG. 14).

By making the fastener 1 described above an injection-molded product of a synthetic resin, it can readily and properly be assured that the elastic deformation characteristics is provided to the portions that should have the characteristics in the fastener 1.

Note that, as a matter of course, this invention is not limited to the embodiments described above and includes all embodiments that can achieve the purpose of this invention.

REFERENCE SIGNS LIST

2 FITTED PORTION
4 ELASTIC PIECE

8 BASE PORTION
8*b* ABUTTING PORTION
Pa THROUGH HOLE
Pc INSERTION POINT
f1 FORCE IN PULLING-OUT DIRECTION
m1 DIRECTION OF APPROACHING BASE PORTION
m2 DIRECTION TOWARD CENTRAL AXIS
x CENTRAL AXIS OF FITTED PORTION

Note that the entire contents of the specification, claims, drawings, and abstract of Japanese Patent Application No. 2021-184572, filed on Nov. 12, 2021, are hereby cited and incorporated as the disclosure of the specification of this invention.

What is claimed is:

1. A fastener comprising:
a fitted portion fitted into a through hole disposed in an object to be fastened,
the fitted portion comprising:
  a base portion; and
  an elastic piece disposed on a side of the base portion, the elastic piece being configured to allow insertion of the fitted portion into the through hole by elastic deformation of the elastic piece in a direction of approaching the base portion and to engage with an edge of the through hole at an insertion point side of the through hole by elastic return of the elastic piece, the elastic piece being configured to, upon application of force in a direction of pulling out the fitted portion from the through hole, cause an elastic deformation in the direction of approaching the base portion,
the base portion being provided with an abutting portion abutting on the elastic piece upon application of the force in a direction of pulling out the fitted portion from the through hole, and
with the force in a direction of pulling out the fitted portion from the through hole being equal to or greater than a predetermined magnitude, the elastic piece bending in a direction toward a central axis of the fitted portion by deforming in a direction substantially orthogonal to the direction of approaching the base portion, the central axis being on an inner side relative to the abutting portion.

2. The fastener according to any one of claim 1, wherein the elastic piece has a bending piece shape including an inner arm portion extending in a direction along the central axis with an interval to the base portion, and an outer arm portion extending from an end of the inner arm portion on the insertion point side toward a foundation portion side of the fitted portion.

3. The fastener according to claim 2, wherein the end of the inner arm portion of the elastic piece on the insertion point side is configured to, upon application of the force in a direction of pulling out the fitted portion from the through hole, abut on the abutting portion of the base portion.

4. The fastener according to claim 3, wherein a support protruding portion is formed on the outer arm portion of the elastic piece, the support protruding portion protruding toward a guide portion side.

5. The fastener according to claim 2, wherein the elastic piece includes four elastic pieces, and distances between an end of the outer arm portion of the four elastic pieces and the central axis are equal to each other among the four elastic pieces, the ends of the outer arm portions engaging with the through hole and being located adjacent to the foundation portion side of the fitted portion.

6. The fastener according to claim 1, wherein both or either one of the abutting portion and a portion, abutting on the abutting portion, of the elastic piece is a protruding portion.

7. The fastener according to claim 1, wherein the elastic piece is disposed on each side of the base portion.

8. The fastener according to claim 1, wherein
the fitted portion includes a guide portion formed to align with one imaginary plane containing the central axis,
the base portion is disposed at least on one side of the guide portion, and
the elastic piece includes two elastic pieces each disposed on each side of the base portion.

9. A fastener comprising:
a fitted portion fitted into a through hole disposed in an object to be fastened,
the fitted portion comprising:
  a base portion; and
  an elastic piece disposed on a side of the base portion, the elastic piece being configured to allow insertion of the fitted portion into the through hole by elastic deformation of the elastic piece in a direction of approaching the base portion and to engage with an edge of the through hole at an insertion point side of the through hole by elastic return of the elastic piece, the elastic piece being configured to, upon application of force in a direction of pulling out the fitted portion from the through hole, cause an elastic deformation in the direction of approaching the base portion,
the base portion being provided with an abutting portion abutting on the elastic piece upon application of the force in a direction of pulling out the fitted portion from the through hole, and
with the force in a direction of pulling out the fitted portion from the through hole being equal to or greater than a predetermined magnitude, the elastic piece bending in a direction toward a central axis of the fitted portion, the central axis being on an inner side relative to the abutting portion, wherein
the fitted portion includes a guide portion formed to align with one imaginary plane containing the central axis, and
an end of the fitted portion on the insertion point side of the through hole is formed of an end of the guide portion.

10. The fastener according to claim 9, wherein the guide portion includes a second portion crossing a first portion at the central axis, the first portion being aligned with the one imaginary plane.

11. The fastener according to claim 9, wherein
the base portion is disposed on each side of the guide portion,
the elastic piece is disposed on each side of the base portion located on a first side of the guide portion, and
the elastic piece is disposed on each side of the base portion located on a second side of the guide portion.

* * * * *